(12) United States Patent
Kurata et al.

(10) Patent No.: US 11,908,458 B2
(45) Date of Patent: Feb. 20, 2024

(54) CUSTOMIZATION OF RECURRENT NEURAL NETWORK TRANSDUCERS FOR SPEECH RECOGNITION

(71) Applicant: INTERNATIONAL BUSINESS MACHINES CORPORATION, Armonk, NY (US)

(72) Inventors: Gakuto Kurata, Tokyo (JP); George Andrei Saon, Stamford, CT (US); Brian E. D. Kingsbury, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 17/136,439

(22) Filed: Dec. 29, 2020

(65) Prior Publication Data

US 2022/0208179 A1 Jun. 30, 2022

(51) Int. Cl.
*G10L 15/16* (2006.01)
*G06N 3/08* (2023.01)
(Continued)

(52) U.S. Cl.
CPC .............. *G10L 15/16* (2013.01); *G06N 3/08* (2013.01); *G10L 13/02* (2013.01); *G10L 25/30* (2013.01)

(58) Field of Classification Search
CPC ......... G10L 15/16; G10L 13/02; G10L 25/30; G06N 3/08
See application file for complete search history.

(56) References Cited

U.S. PATENT DOCUMENTS

2009/0327846 A1* 12/2009 Senda ................. H03M 13/235
714/E11.034
2019/0156194 A1* 5/2019 Burr ......................... G06N 3/08
(Continued)

FOREIGN PATENT DOCUMENTS

| CN | 106328122 A | 1/2017 |
| CN | 110556100 A | 12/2019 |
| CN | 111916067 A | 11/2020 |

OTHER PUBLICATIONS

Li, Jinyu, et al. "Developing RNN-T models surpassing high-performance hybrid models with customization capability." arXiv preprint arXiv:2007.15188 (2020) (Year: 2020).*

(Continued)

*Primary Examiner* — Douglas Godbold
*Assistant Examiner* — Edward Tracy, Jr.
(74) *Attorney, Agent, or Firm* — Tutunjian & Bitetto, P.C.; Robert Richard Aragona

(57) ABSTRACT

A computer-implemented method for customizing a recurrent neural network transducer (RNN-T) is provided. The computer implemented method includes synthesizing first domain audio data from first domain text data, and feeding the synthesized first domain audio data into a trained encoder of the recurrent neural network transducer (RNN-T) having an initial condition, wherein the encoder is updated using the synthesized first domain audio data and the first domain text data. The computer implemented method further includes synthesizing second domain audio data from second domain text data, and feeding the synthesized second domain audio data into the updated encoder of the recurrent neural network transducer (RNN-T), wherein the prediction network is updated using the synthesized second domain audio data and the second domain text data. The computer implemented method further includes restoring the updated encoder to the initial condition.

19 Claims, 9 Drawing Sheets

(51) Int. Cl.
*G10L 13/02* (2013.01)
*G10L 25/30* (2013.01)

(56) References Cited

U.S. PATENT DOCUMENTS

| | | | |
|---|---|---|---|
| 2019/0267023 A1* | 8/2019 | Das | G10L 15/063 |
| 2020/0126538 A1 | 4/2020 | Han et al. | |
| 2020/0327884 A1 | 10/2020 | Bui et al. | |
| 2020/0349922 A1 | 11/2020 | Peyser et al. | |
| 2020/0402501 A1* | 12/2020 | Prabhavalkar | G10L 19/04 |
| 2021/0225369 A1* | 7/2021 | Hu | G10L 15/187 |
| 2021/0280170 A1* | 9/2021 | Chen | G06N 3/0445 |
| 2022/0028444 A1* | 1/2022 | Papageorgiou | G06N 3/0481 |
| 2022/0108689 A1* | 4/2022 | Tripathi | G10L 15/22 |

OTHER PUBLICATIONS

Sim, Khe Chai, et al. "Personalization of end-to-end speech recognition on mobile devices for named entities." 2019 IEEE Automatic Speech Recognition and Understanding Workshop (ASRU). IEEE, 2019. (Year: 2019).*

Bagby et al., "Efficient Implementation of Recurrent Neural Network Transducer in Tensorflow", SLT 2018, Dec. 2018, pp. 506-512.

Ghodsi et al., "RNN-Transducer with Stateless Prediction Network", ICASSP 2020, pp. 7049-7053.

Graves et al., "Speech Recognition with Deep Recurrent Neural Networks", arXiv:1303.5778v1 [cs.NE] Mar. 22, 2013, 5 pages.

Graves et al., "Sequence Transduction with Recurrent Neural Networks", arXiv:1211.3711v1 [cs.NE] Nov. 14, 2012, 9 bages.

Li et al., "Developing RNN-T Models Surpassing High-Performance Hybrid Models with Customization Capability", arXiv:2007.15188v1 [eess.AS] Jul. 30, 2020, 5 pages.

Li et al., "Improving RNN Transducer Modeling for End-To-End Speech Recognition", arXiv:1909.12415v1 [cs.CL] Sep. 26, 2019, 8 pages.

Mell et al. "The NIST Definition of Cloud Computing", NIST Special Publication 800-145, 2011, 7 pages.

Sharma et al., "Adaptation of Rnn Transducer With Text-To-Speech Technology for Keyword Spotting", ICASSP 2020, pp. 7484-7488.

International Search Report issued in PCT Application No. PCT/IB2021/061019, dated Mar. 2, 2022, pp. 1-10.

* cited by examiner

CUSTOMIZATION OF RECURRENT NEURAL NETWORK TRANSDUCERS FOR SPEECH RECOGNITION

BACKGROUND

The present invention generally relates to speech recognition, and more particularly to a method and system for training an end-to-end speech recognition model.

A recurrent neural network (RNN) is a type of artificial neural network, where connections between nodes form a directed graph along a time series. This allows the RNN to analyze sequential dependencies among attributes, such as phonemes. Derived from feedforward neural networks, RNNs can use their internal state (memory) to process variable length sequences of inputs. The RNN also can encode ordering information directly. The RNN can receive and process inputs in the same order as in the original sequence. This makes them applicable to tasks such as unsegmented, connected handwriting recognition or speech recognition. The inputted values of the time series can be real-valued or symbolic.

The RNN can have a fixed number of parameters and also process a variable number of inputs. The RNN can have a one-to-one relationship between the number of positions in a sequence and the number of layers in the network. Each layer can have a single input for a specific position in the sequence (e.g., time step). The inputs can, thereby, interact with hidden layers depending on the input's position in the sequence. The layer architecture is repeated in time, so referred to as recurrent. The RNNs may require a predefined alignment between the input and output sequences to perform transduction. This can be a limitation, since finding the alignment can be a very difficult aspect of the sequence transduction problem.

An end-to-end (E2E) automatic speech recognition (ASR) system can directly transduce a sequence of acoustic features to an output sequence of tokens (phonemes, characters, words, etc.) by mapping the acoustic features to an output token sequence. End-to-end models for ASR can directly output word transcripts given the input audio.

SUMMARY

In accordance with an embodiment of the present invention, a computer-implemented method for customizing a recurrent neural network transducer (RNN-T) is provided. The computer implemented method includes synthesizing first domain audio data from first domain text data, and feeding the synthesized first domain audio data into a trained encoder of the recurrent neural network transducer (RNN-T) having an initial condition, wherein the encoder is updated using the synthesized first domain audio data and the first domain text data. The computer implemented method further includes synthesizing second domain audio data from second domain text data, and feeding the synthesized second domain audio data into the updated encoder of the recurrent neural network transducer (RNN-T), wherein the prediction network is updated using the synthesized second domain audio data and the second domain text data. The computer implemented method further includes restoring the updated encoder to the initial condition.

In accordance with another embodiment of the present invention, a system for customizing a recurrent neural network transducer (RNN-T) is provided. The system includes, one or more processor devices, a memory in communication with at least one of the one or more processor devices, and a display screen, wherein the memory includes a synthesizer configured to synthesize first domain audio data from first domain text data, and to synthesize second domain audio data from second domain text data, and an encoder configured to receive synthesized first domain audio data generated from first domain text data, wherein the encoder is a trained encoder of the recurrent neural network transducer (RNN-T) having an initial condition, wherein the encoder is configured to be updated from the initial condition using the synthesized first domain audio data and the first domain text data, wherein the encoder is further configured to receive synthesized second domain audio data generated from second domain text data. The memory further includes an output sequence generator that produces output symbol sequence, y, based on an input feature sequence, x, that is a time-ordered sequence of acoustic features represented as vectors.

In accordance with yet another embodiment of the present invention, computer program product for customizing a recurrent neural network transducer (RNN-T), the computer program product comprising one or more computer readable storage media, and program instructions collectively stored on the one or more computer readable storage media, the program instructions executable by a computer, is provided. The computer program product, which when executed causes a computer to synthesize first domain audio data from first domain text data, and feed the synthesized first domain audio data into a trained encoder of the recurrent neural network transducer (RNN-T) having an initial condition, wherein the encoder is updated using the synthesized first domain audio data and the first domain text data. The computer program product, which when executed also causes a computer to synthesize second domain audio data from second domain text data, and feed the synthesized second domain audio data into the updated encoder of the recurrent neural network transducer (RNN-T), wherein a predictor is updated using the synthesized second domain audio data and the second domain text data. The computer program product, which when executed also causes a computer to restore the updated encoder to the initial condition.

In accordance with yet another embodiment of the present invention, a computer-implemented method for customizing a recurrent neural network transducer (RNN-T) is provided. The computer-implemented method includes synthesizing first domain audio data from first domain text data, and feeding the synthesized first domain audio data into a trained encoder of the recurrent neural network transducer (RNN-T) having an initial condition, wherein the encoder is updated using the synthesized first domain audio data and the first domain text data, and encodes the synthesized first domain audio data into acoustic embedding, $a_t$, wherein the acoustic embedding, $a_t$, compresses the synthesized first domain audio data into a smaller feature space. The computer-implemented method further includes feeding the acoustic embedding, $a_t$, to a joiner, and synthesizing second domain audio data from second domain text data. The computer-implemented method further includes feeding the synthesized second domain audio data into the updated encoder, wherein the updated encoder encodes the synthesized second domain audio data into acoustic embedding, $b_t$, wherein the acoustic embedding, $b_t$, compresses the synthesized second domain audio data into a smaller feature space, and feeding the output sequence from the joiner into a predictor of the recurrent neural network transducer (RNN-T), wherein the predictor is updated using the output sequence from the synthesized second domain audio data and the second domain text data. The computer-implemented method further includes restoring the updated encoder to the initial condition.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide systems/ and methods for language model customization from a sufficiently strong base RNN-T model to a specific target domain. The RNN-T can be trained from scratch in advance. The trained RNN-T can be customized to a specific domain by a user.

A beam search over one neural network may be done for inference, resulting in smaller computational cost, smaller memory footprint, and simpler inference engine.

In various embodiments, this approach can address RNN-T based modeling, where "language model" and "vocabulary" are integrated into one neural network with other modules and cannot be directly manipulated from outside after the network has been trained and deployed.

Exemplary applications/uses to which the present invention can be applied include, but are not limited to: automatic speech recognition (ASR), natural language translation, etc.

It is to be understood that aspects of the present invention will be described in terms of a given illustrative architecture; however, other architectures, structures, and process features and steps can be varied within the scope of aspects of the present invention.

Figure 1:
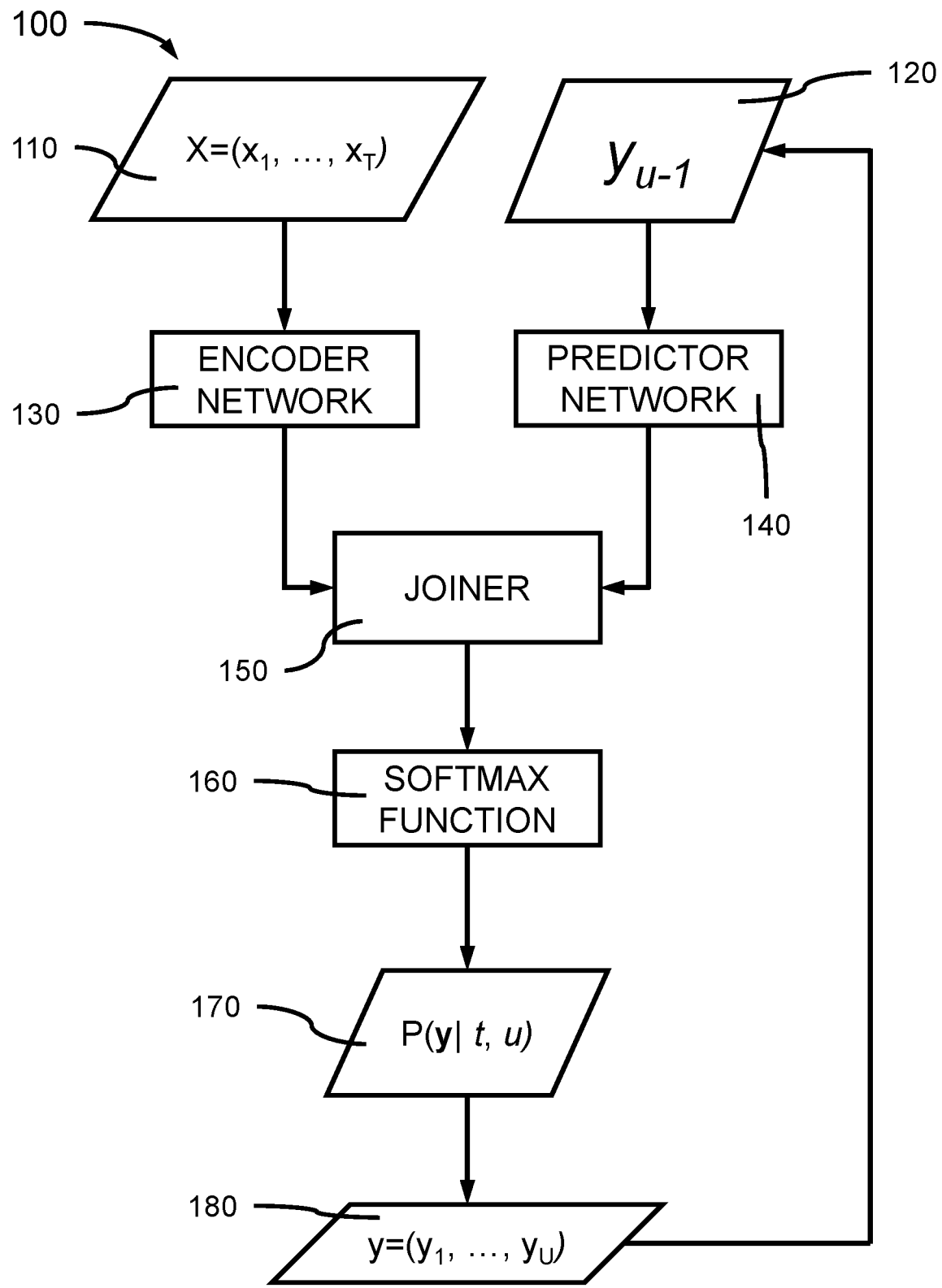
FIG. 1 is a diagram of an architecture for a recurrent neural network transducer (RNN-T) that can be applied to speech recognition, in accordance with an embodiment of the present invention.

Referring now to the drawings in which like numerals represent the same or similar elements and initially to FIG. 1, a diagram of an architecture for a recurrent neural network transducer (RNN-T) that can be applied to speech recognition is shown, in accordance with an embodiment of the present invention.

Automatic speech recognition (ASR) utilizing Deep Neural Networks (DNN) can use a hybrid framework implementing several models concurrently. The models for the hybrid system can include acoustic models (AM) and Language Models (LM). An RNN-T model can include three parts, a predictor network that encodes a sequence of labels into a text embedding, an encoder network that encodes a sequence of observation vectors into acoustic embeddings, and a neural network (e.g., Joiner) with a softmax output layer that combines the text and acoustic embeddings.

"Language model" customization is a function that enables developers and users to add their particular application(s), and use-case specific words, phrases, and sentences, for automatic speech recognition (ASR) to a trained language model. In other words, customization modifies a language model (LM that has been previously trained and deployed, thereby providing flexible and efficient customization capability. In various embodiments, in a hybrid system an acoustic model, language model, and vocabulary are explicitly modularized. Therefore, "language model" customization can be easily realized because the language model and vocabulary can be directly manipulated and modified even after they have been trained and deployed.

In one or more embodiments, an RNN-T 100 for ASR can have three components, including an Encoder 130 for audio, a Predictor 140 for text, and a Joiner 150 for combining the outputs of the encoder 130 and the predictor 140. The encoder 130 can encode audio frames at a time t, as acoustic embedding $a_t$, where an embedding can compress the input feature space into a smaller feature space. An acoustic model (AM) can be incorporated into the encoder 130. The predictor 140 can encode a text history up to index h, as a text embedding $t_h$. A language model can be incorporated into the predictor 140. The text embedding vector(s) and encoder output(s) can be fixed-dimension real-valued vectors. These embeddings can be fed to the joiner 150, which combines them to produce a probability distribution over the output units at $y_{t,h}$.

In various embodiments, frame-level alignments between audio and output symbols are not utilized to train or customize the RNN-T. A pair of text and synthesized audio from the text can be used to train or customize the RNN-T, where an end-to-end model can be trained from pairs of audio and transcripts without pre-computed alignments. A computer-implemented method can include updating the encoder network by using synthesized first domain audio data and the first domain text data.

In various embodiments, an input feature sequence, x, 110 can be feed into an encoder 130 of a recurrent neural network transducer (RNN-T) 100, where the input feature sequence, x, can be a time-ordered sequence of acoustic features represented as vectors. In various embodiments, $x=(x_1, x_2, \ldots, x_T)$ can be a length T input sequence of arbitrary length. In one or more embodiments, audio data can be synthesized from text available in a source domain. The text used to synthesize the audio data can be the same text that is used in the training of the original RNN-T ASR model. The acoustic model of the encoder 130 can convert the acoustic feature(s) $x_t$ into a high-level representation $h_t^{enc}$, where t is time index. $h_t^{enc}=f(x_t)$, where $h_t^{enc}$ can be an embedding vector sequence of length T, where embedding can compress the input feature space into a smaller output vector (dense vectors) of a fixed size, length T. In various embodiments, the encoder 130 can be a unidirectional encoder network or a bidirectional encoder network.

The predictor 140 can function as a RNN language model, which produces a high-level representation $h_u^{pre}$ by conditioning on the previous non-blank target $y_{u-1}$ predicted by the RNN-T model, where u is output label index. $h_u^{pre}=f(y_{u-1})$, where $h_y^{pre}$ is an embedding vector.

Transforming audio signals into sequences of words requires the ability to identify speech sounds (such as phonemes or syllables) despite the apparent distortions created by different voices. RNNs may be applied to problems of mapping the input sequence and the output sequence. Where the RNN outputs are probabilistic, a distribution over output sequences of the same length as the input sequence can result. Speech recognition involves determining the most likely word sequence, $W=w_1, \ldots, w_n$, given an acoustic input sequence, $x=x_1, \ldots, x_T$, where T can represent the number of frames in the utterance.

In various embodiments, an output symbol sequence, y, 120 having a length, u-1, can be fed into a prediction neural network 140 that can behave as a language model, where the output symbol sequence, y, is generated by the recurrent neural network transducer (RNN-T). $y_{u-1}$ in 120 indicates the previous prediction (e.g., symbol). The RNN-T predicts the next symbol $y_u$ based on the previous symbol sequence up to u-1. In various embodiments, $y=(y_1, y_2, \ldots, y_U)$ can be a length U sequence of target output symbols belonging to the set Y. The target symbol set can be letters, phonemes, graphemes, wordpieces, and so on.

In RNN-T modeling, an extra blank symbol $\phi$ can be introduced to expand the length U sequence y to a set of length-(T+U) sequences $\Phi(y)$. The symbol or label sequence length (U) and acoustic feature frames (T) may not be the same length.

Since the output of the prediction neural network 140 is merged with the output of the encoder 130 at joiner 150 before producing the output symbols, directly manipulating the prediction network 140 for customization (adding words, phrases, and sentences) would not be possible.

In various embodiments, the inputs vectors $x_t$ and the output vectors $y_u$ can be represented as fixed-length real-valued vectors; for example, for character-based speech recognition, each $x_t$ could be a vector of mel-frequency cepstrum coefficients (MFCC), and each $y_t$ could be a one-hot vector encoding a particular character, where the mel-frequency cepstrum coefficient (MFCC) is a representation of the short-term power spectrum of a sound. The inputs vectors $x_t$ and the output vectors $y_u$ can be mapped, where the inputs vectors $x_t$ and the output vectors $y_u$ can have different lengths T and U.

In various embodiments, the encoder 130 can initially be trained in advance. Before training the RNN-T, the encoder network 130 and prediction network 140 can be initialized.

In various embodiments, an acoustic model and a cross-entropy language model are obtained in advance, where the acoustic model can be a phoneme acoustic model. In various embodiments, the cross-entropy language model can be a character cross-entropy language model, a sub-word cross-entropy language model, or a word cross-entropy language model.

In various embodiments, the encoder 130 of the end-to-end speech recognition model can be initialized based on the acoustic model. The encoder network 130 also can be updated using a pair of synthesized audio and the associated text from a source domain. The "source" data is the training data used to train the original RNN-T before customization.

In various embodiments, a predictor network 140 acts as a language modeler that determines/predicts the text associated with the input audio.

In various embodiments, the prediction network 140 can be a recurrent neural network, where the prediction network 140 can have an input layer, an output layer and one or more hidden layer(s). The size of the input layer can be the same as the length of the input vector, where there can be labels $K=\{k_1, k_2, \ldots k_K(\}$, and $y_u$ can equal $k_k$. where n is an index $1 \leq k \leq K$. The inputs can be encoded as one-hot vectors.

In various embodiments, the Prediction Network 140 output is merged with the output from the encoder network 130 before emitting the output symbols. In a character-based system, the output symbol(s) from the RNN-T (after a softmax computation) is the set of characters and the <BLANK> symbol. In various embodiments, the <BLANK> symbol is not used in the history of the prediction network. Directly manipulating the prediction network 140 for customization (adding words, phrases, and sentences) is not possible. Output from both the encoder network 130 and prediction network 140 is used to update the prediction network 140 or the whole RNN-T 100. However, if the RNN-T 100 is to be customized only with text data, when audio data is unavailable, output from the encoder network 130 would not be obtained.

In various embodiments, an output feature sequence, y, 180 can be an output sequence generated by the RNN-T 100 based on the input feature sequence, x, 110 by a search over an output probability lattice defined by P(y|t,u), where $y=(y_1, y_2, \ldots y_{U-1}, y_U)$ can be a length U output sequence belonging to the set Y* of all sequences over some output space Y, and P(y|t,u) is the posterior probability of y given "t" and "u", where "t" is an index over time in the time-ordered sequence of acoustic features represented as vectors, and u is the index over the length U output sequence. In various embodiments, $y=(y_1, y_2, \ldots, y_{u-1})$ is fed into a prediction network 140.

In various embodiments, a Connectionist Temporal Classification (CTC) model is trained with acoustic features, x, represented as vectors as input and phonemes as output to obtain a phoneme acoustic model. The neural network trained with this CTC modeling can be used to initialize the encoder network 130 of RNN-T 100. The phoneme acoustic model can be used as an initial acoustic model for encoder network 130 of RNN-T 100. The acoustic feature can be used as an input, and a modeling unit can be set as an output to train the initial acoustic model to obtain a target acoustic model.

In various embodiments, Cross Entropy (CE) can be used to train a language model (LM). The CTC acoustic model and the CE language model can be used to initialize the encoder 130 (Encoder) and predictor 140 (Decoder) of the end-to-end system, respectively. After initialization, the end-to-end system can have a suitable initial state.

The RNN-T training can be started from a pre-trained model, or without pre-training, training can start from a random initialization.

In various embodiments, the language model can include a LSTM layer and a first input embedding layer. The LSTM can be utilized for both the encoder network 130 and the prediction network 140, however other types of neural networks, such as a Transformer, can also be used for either or both the encoder and prediction networks.

In various embodiments, the output generated by the encoder 130 and the predictor 140 can be combined by a joiner 150, where the joiner 150 can produce a weighted summation of the high-level representation $h_t^{enc}$, $h_u^{pre}$, (embedding vectors). The joiner network 150 can output an embedding $z_{t,u}$ (a logit) by combining the output from the encoder network $h_t^{enc}$ and the output from the prediction network $h_u^{pre}$. In various embodiments, the joiner 150 is a feed-forward network that combines the encoder network output $h_t^{enc}$ and the prediction network output $h_u^{pre}$ as a sum of linear transformations of both embeddings:

$$z_{t,u} = f^{joint}(h_t^{enc}, h_u^{pre}) = \psi(W^{enc}h_t^{enc} + W^{pre}h_u^{pre} + b_z)$$

where $W^{enc}$ and $W^{pre}$ are weight matrices, $b_z$ is a bias vector, and $\psi$ is a non-linear function, e.g. Tanh or ReLU.

The $z_{t,u}$ is connected to the output layer with a linear transform:

$$h_{t,u} = (W_y z_{t,u} + b_y),$$

where W is a weight matrix, $b_y$, is a bias vector.

In various embodiments, a softmax function 160 is applied to the output of the joiner 150, where the softmax function 160 is an activation function that normalizes the output of the joiner neural network 150 to produce a probability (posterior) distribution 170, $P(y_{t+u}|t,u)$, over predicted output classes. $P(y_{t+u}|t,u)$ defines a posterior lattice, where each node represents a posterior distribution. The predicted output classes can be the characters or subwords (portions of a word) of the text training corpus/lexicon. The softmax function 160 can be an output layer of the RNN-T 100.

In various embodiments, the probability distribution 170 can be used to generate the output feature sequence, y, 180, where the output feature sequence, y, 180 can be generated by a search over the output probability lattice defined by P(y|t,u). An output symbol sequence, y, 120 can be used to update the predictor 140. When training the model, a beam search may not be utilized because the pair of the symbol sequence and the input audio feature are both given, so the posterior probability lattice can be calculated. By minimizing the RNN-T loss, the parameters are updated. The RNN-T loss is defined as the summation of symbol posterior probabilities over all possible RNN-T alignments:

$$\mathcal{L}_{RNN-T} = -\Sigma_{\hat{y}=\Phi(y)} P(\hat{y}|x),$$

where each sequence $\hat{y} \in \Phi(y)$ is one of the RNN-T alignments between x and y, where the elements of $\hat{y} = (\hat{y}_1, \hat{y}_2, \ldots, \hat{y}_{T+U})$ belong to the symbol set of $\mathcal{Y}\{\Phi \cup\}$.

In various embodiments, end-to-end training only from transcripts and audio can be accomplished, where iterative and long training steps required in the hybrid modeling are not needed. In various embodiments, a lexicon that ties spelling and pronunciation also is not needed. The RNN-T can be trained from an associated pair of audio data and their transcriptions.

In one or more embodiments, audio data can be synthesized from text available in a source domain. The text used to synthesize the audio data can be the same text that is used in the training of the original RNN-T model. When updating the encoder network, we use the synthesized audio for the text used in the training for the original RNN-T model. Thus, the encoder network can be updated with being conditioned on the appropriate output from the prediction network.

In various embodiments, the encoder network can be updated using the pair of synthesized audio and the text from the source domain.

Audio data can also be synthesized for the text in a target domain.

In various embodiments, the prediction network can be updated by using the pair of synthesized audio and the text from the target domain. When updating the prediction network, the encoder network would have already been adapted to the synthesized audio of the source domain. Thus, the prediction network can be updated with being conditioned on the appropriate output from the encoder network.

In various embodiments, the encoder network can be restored to its original condition. While the quality of the synthesized audio has been improving recently, updating the encoder network for speech recognition by using synthesized audio is not always valuable. The final encoder network can be the same as the original encoder network without being contaminated by the synthesized audio from the target domain used for customization. The encoder can be reset to its initial state once the customized features are no longer wanted.

Figure 2:
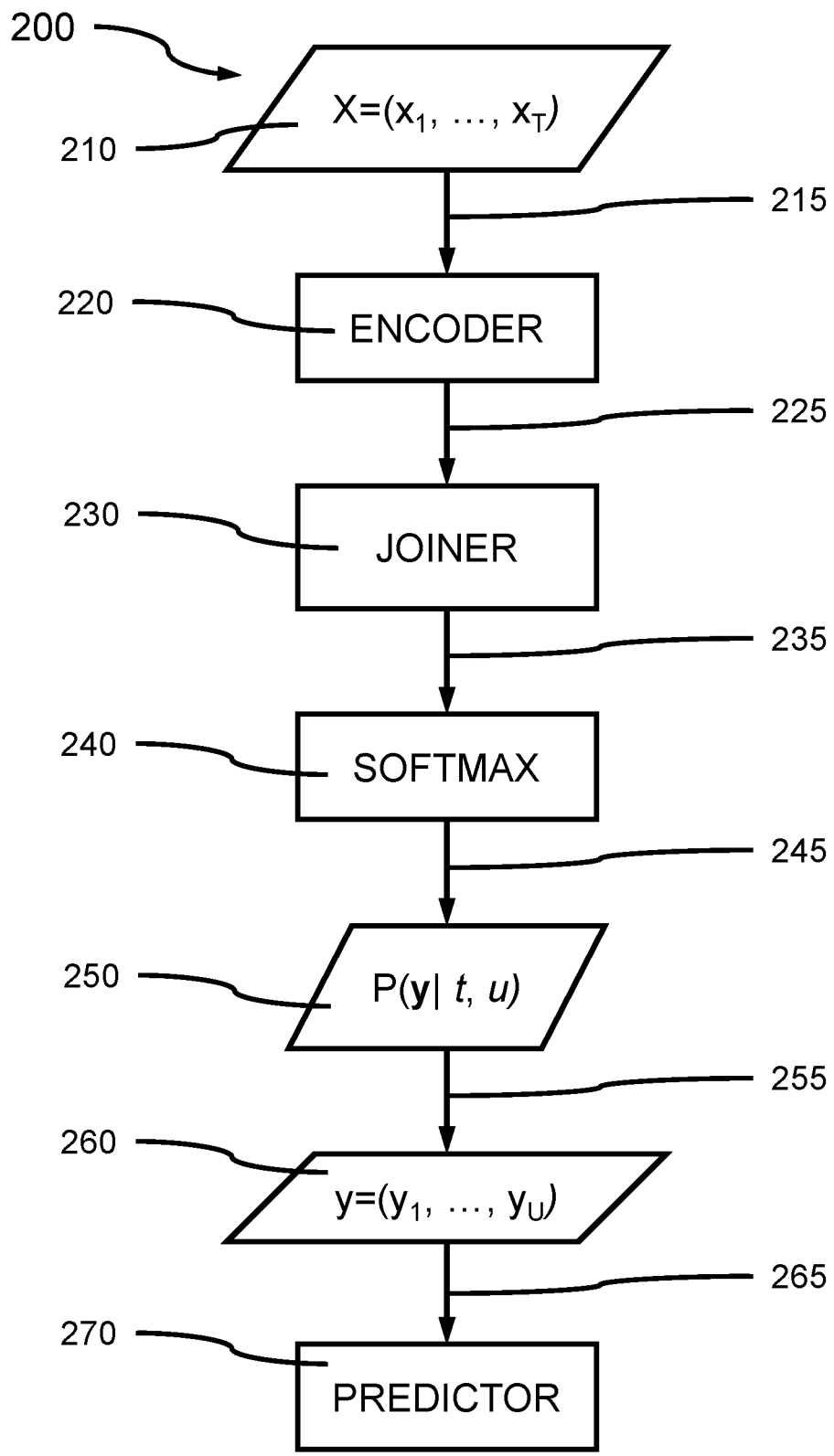
FIG. 2 is a block/flow diagram illustrating an algorithm for training a recurrent neural network transducer (RNN-T) for speech recognition, in accordance with an embodiment of the present invention.

FIG. 2 is a block/flow diagram illustrating an algorithm for training a recurrent neural network transducer (RNN-T) for speech recognition, in accordance with an embodiment of the present invention.

In one or more embodiments, an algorithm 200 for training the recurrent neural network transducer (RNN-T) can involve preparing an input feature sequence, x, of acoustic features represented as vectors, where the input feature sequence, x, can be audio data synthesized from text used to initially train the (original) RNN-T. The encoder network can be initially trained. The audio data can be synthesized from text of a source domain, where the source domain can be represented by a standard corpus.

At block 210, a feature sequence, x, of acoustic features can be synthesized by reading text for a source domain.

At 215, feature sequence, x, of acoustic features can be fed into an encoder 130 of an RNN-T, where the acoustic features can be a vector of mel-frequency cepstrum coefficients (MFCC).

At block 220, the encoder can be trained using the associated pair of synthesized audio and the text in the source domain. The encoder can generate a hidden vector sequence ($h_0, h_1, \ldots, h_T$). The input audio feature can have a length, T. A hidden vector, $h_t$, can be calculated for each audio feature.

At 225, the hidden vector sequence ($h_0, h_1, \ldots, h_T$) can be fed into the joiner 230.

At block 230, the joiner combines the hidden vector sequence ($h_0, h_1, \ldots, h_t$) with the hidden vector sequence ($h_0, h_1, \ldots, h_{u-1}$) from a predictor 270 to produce an induced local field, $z_{t,u}$, that is related to the indexes t and u of $h_T$ and $h_u$, ($h_u^{pred}, h_t^{enc}$).

At 235, the induced local field, $z_{t,u}$, is fed into the softmax function 240.

At 240, the softmax function generates a posterior probability, P(y|t,u) 250.

At 245, a posterior probability, P(y|t,u) is output by the softmax function.

At 250, the output from 240 is P(y|t,u).

At 255, P(y|t,u) is fed into an output sequence generator 260 that produces output symbol sequence, y, having length U.

At block 260, the output sequence generator 260 produces output symbol sequence, y, having length U.

At 265, the output symbol sequence, y, having length U-1 is fed into the predictor neural network 270 to update predictor neural network 270, where $y_{u-1}$ in 120 indicates the previous prediction (e.g., letter(s)). Based on the previous word sequence up to u−1, the RNN-T predicts the next symbol, $y_u$.

At block 270 the predictor neural network 270 is updated, and the hidden vector sequence ($h_0, h_1, \ldots, h_U$) generated.

Figure 3:
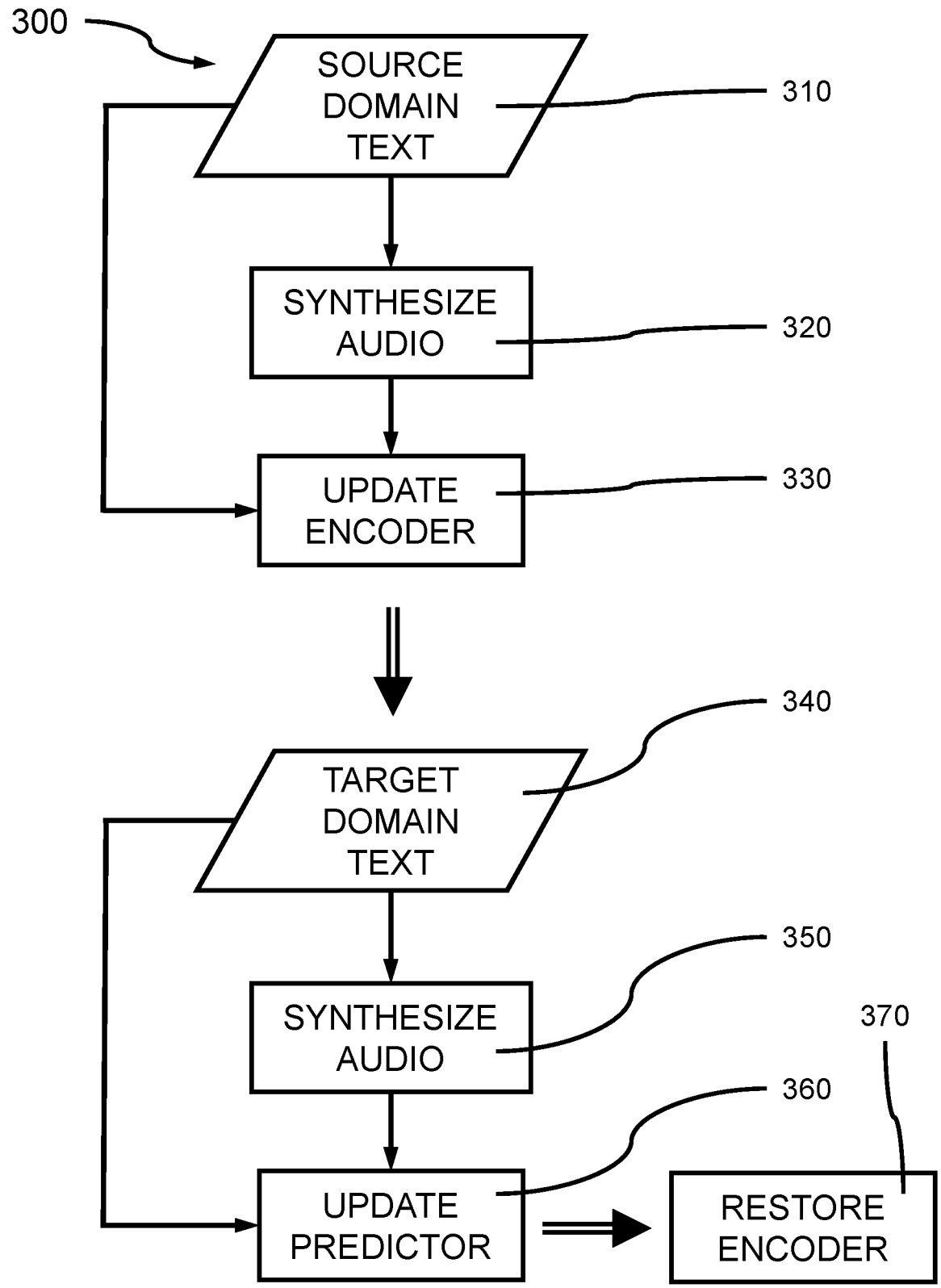
FIG. 3 is a block/flow diagram illustrating an algorithm for synthesizing audio features from text, updating the encoder and predictor, and restoring the encoder, in accordance with an embodiment of the present invention.

FIG. 3 is a block/flow diagram illustrating an algorithm for synthesizing audio features from text, updating the encoder and predictor, and restoring the encoder, in accordance with an embodiment of the present invention.

At block 310, identify source domain text to be used for training.

At block 320, synthesize audio data for the source domain training of an encoder from text from the source domain.

At block 330, update the encoder network, while maintaining the weights of the predictor neural network and joiner neural network constant (i.e., fixed).

At block 340, identify target domain text to be used for training.

At block 350, synthesize audio for the target domain training of the predictor from the text of the target domain. In put the synthesize audio for the target domain into the encoder. In various embodiments, only the prediction network is updated. The Encoder network is not updated by the synthesized audio for the target domain.

At block 360, update the predictor network while maintaining the weights of the encoder neural network and joiner neural network constant.

At block 370, restore the encoder network to the weights before feeding the target domain audio during the actual deployment of the customized model. Restoring the weighted on the encoder network to a state trained on the source domain can reset the encoder to a pre-customization state.

Figure 4:
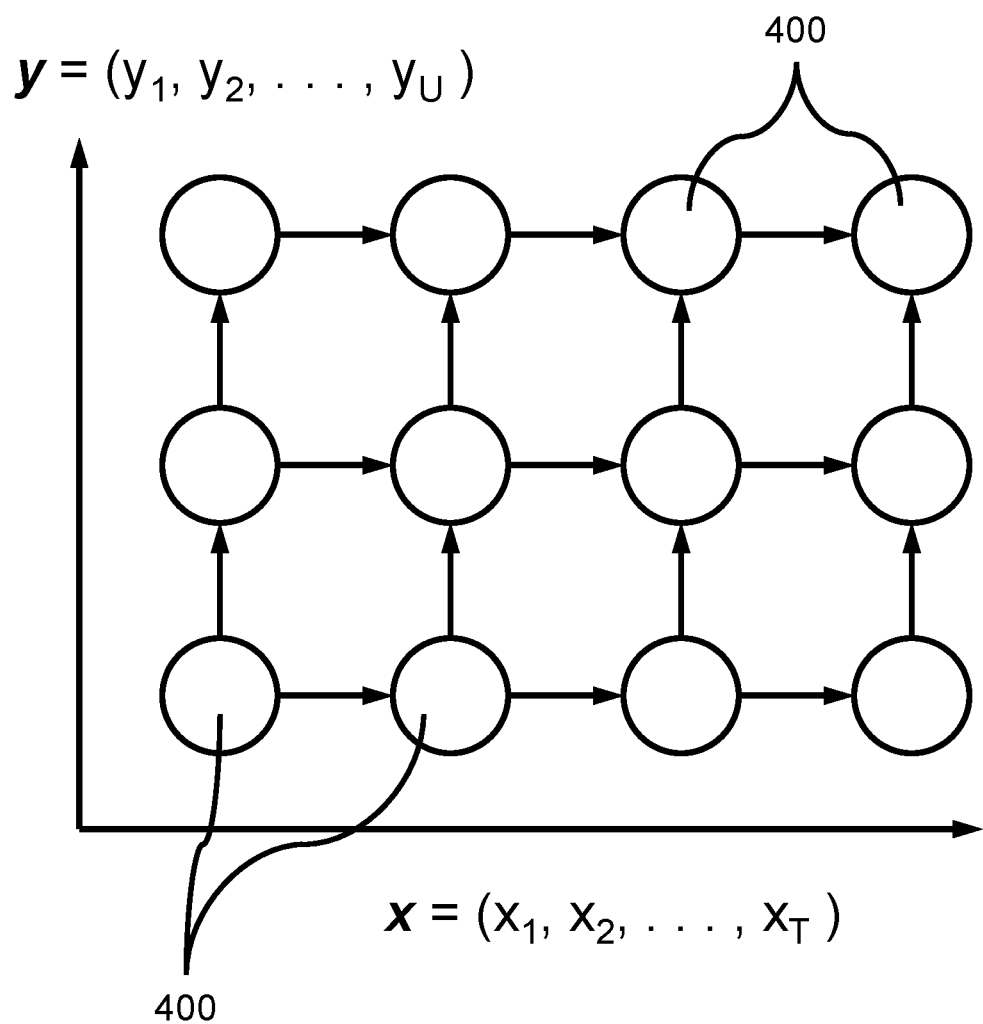
FIG. 4 is a diagram of a Posterior Lattice for an RNN-T, in accordance with an embodiment of the present invention.

FIG. 4 is a diagram of a Posterior Lattice for an RNN-T, in accordance with an embodiment of the present invention.

$y=(y_1, y_2, \ldots, y_U)$ can denote a length-U sequence of target output symbols translating vertically.

$x=(x_1, x_2, \ldots, x_T)$ can denote an acoustic feature vector over T time steps.

Each node 400 represents a posterior distribution, P(y|t,u) defined by, $P(y_{t+u}|k,u)$.

Figure 5:
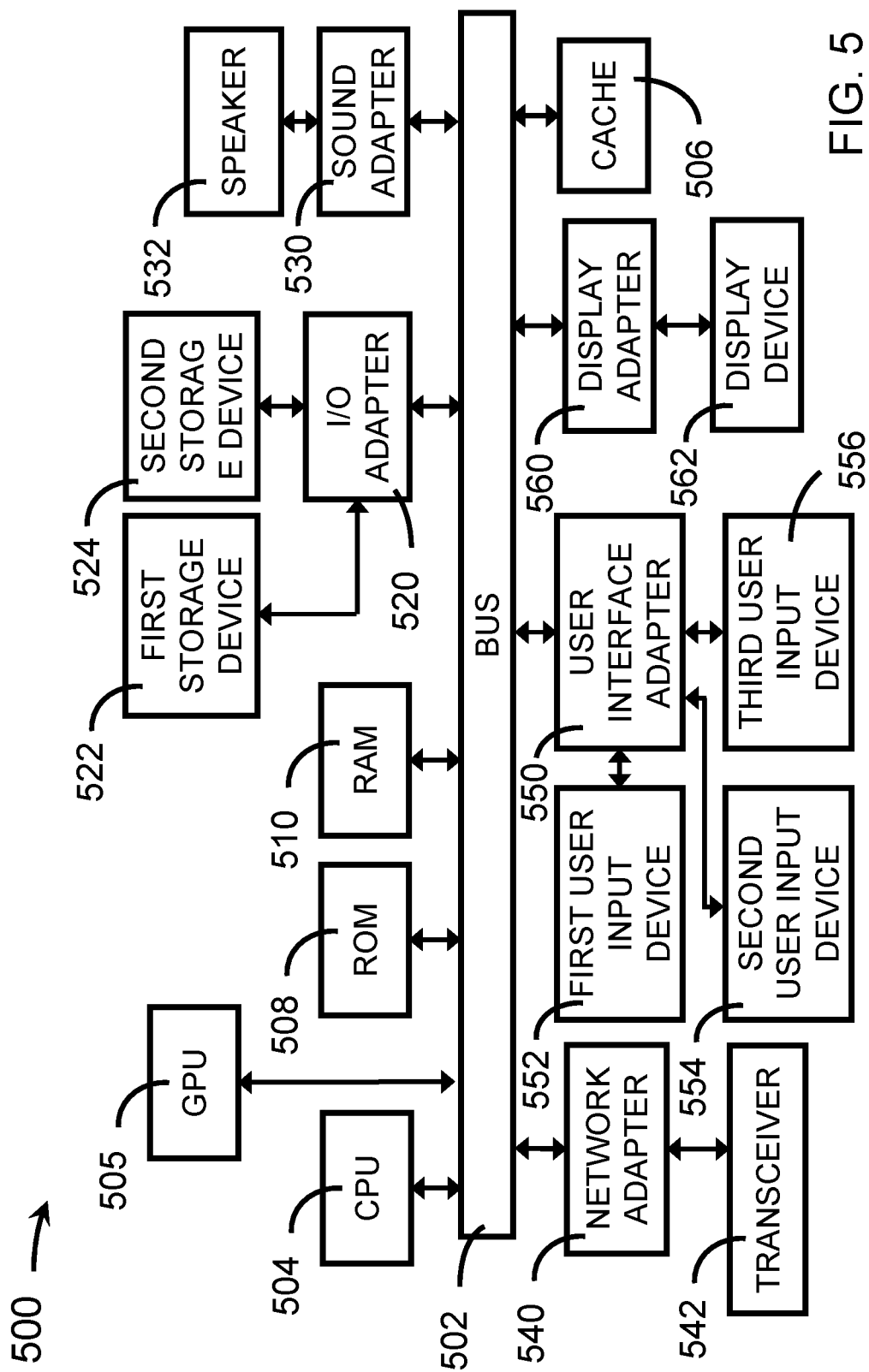
FIG. 5 is an exemplary processing system to which the present methods and systems may be applied, in accordance with an embodiment of the present invention.

FIG. 5 is an exemplary processing system 500 to which the present methods and systems may be applied, in accordance with an embodiment of the present invention.

In various embodiments, the processing system 500 can include at least one processor (CPU) 504 and may have a graphics processing (GPU) 505 that can perform vector calculations/manipulations operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, can be operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state device, a magnetic storage device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 can be used to input and output information to and from system 500.

In various embodiments, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Moreover, it is to be appreciated that system 500 is a computer system for implementing respective embodiments of the present methods/systems. Part or all of processing system 500 may be implemented in one or more of the elements of FIGS. 1-4. Further, it is to be appreciated that processing system 500 may perform at least part of the methods described herein including, for example, at least part of the method of FIGS. 1-4.

Figure 6:
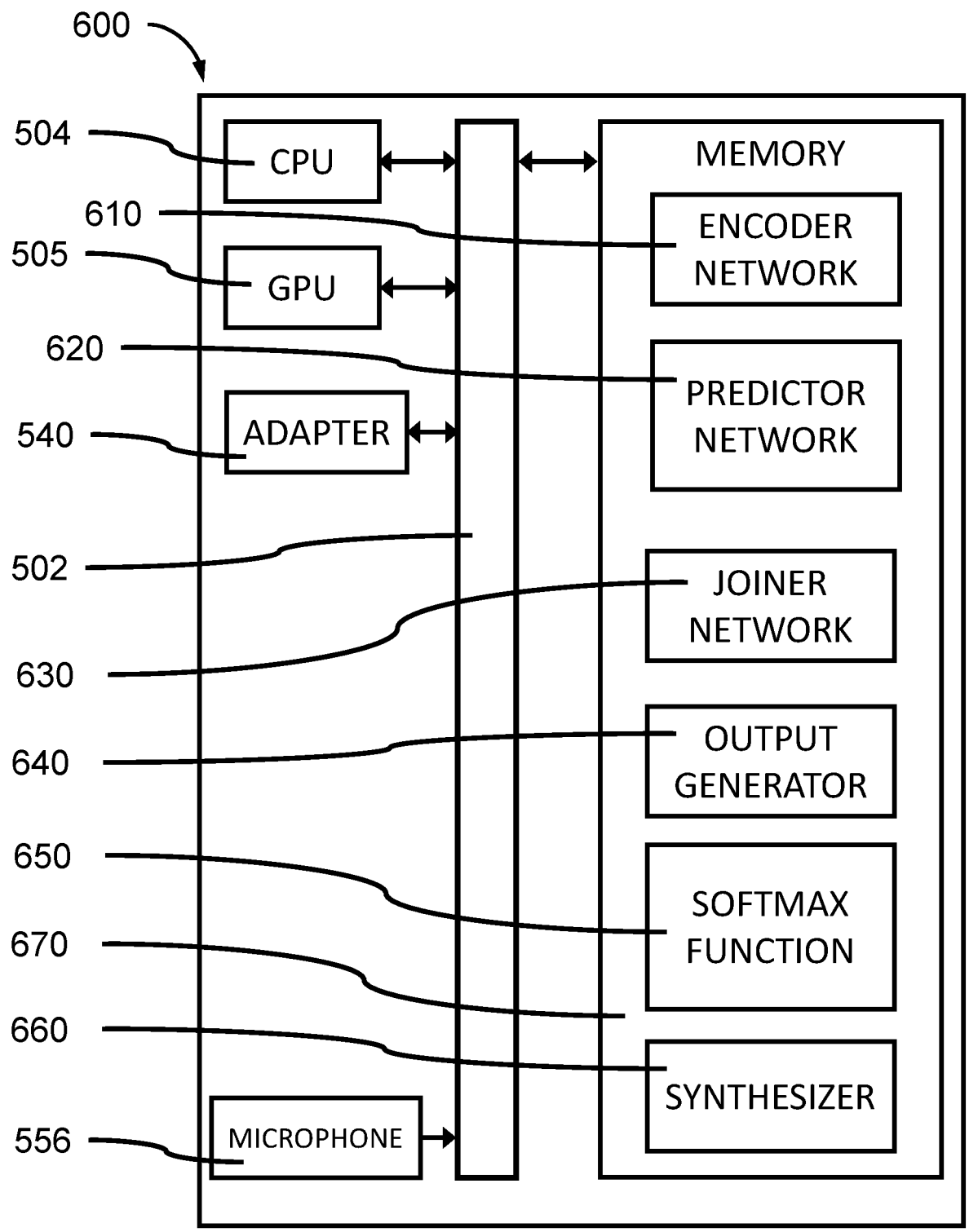
FIG. 6 is an exemplary processing system configured to implement one or more neural networks for modeling road layouts, in accordance with an embodiment of the present invention.

FIG. 6 is an exemplary processing system 600 configured to implement one or more neural networks for modeling road layouts, in accordance with an embodiment of the present invention.

In one or more embodiments, the processing system 600 can be a computer system 500 configured to perform a computer implemented method of customization of recurrent neural network transducers for speech recognition.

In one or more embodiments, the processing system 600 can be a computer system 500 having memory components 670, including, but not limited to, the computer system's random access memory (RAM) 510, hard drives 522, and/or cloud storage to store and implement a computer implemented method of understanding road layouts from video images. The memory components 670 can also utilize a database for organizing the memory storage.

In various embodiments, the memory components 670 can include an Encoder Neural Network 610 that can be configured to implement a plurality of acoustic models configured to model an acoustic input and perform automatic speech recognition (ASR). In various embodiments, the Encoder Neural Network 610 may be implemented as a Long Short Term Memory (LSTM) or bidirectional LSTM (BLSTM). The Encoder Neural Network 610 can also be configured to receive as input acoustic signals. The input can be a sequential set of audio data received by a microphone 556. The Encoder Neural Network 610 can also be configured to generate output values that are embeddings.

In various embodiments, the memory components 670 can include a Predictor Neural Network 620 that can be configured to learn one or more acoustic models, and configured to generate encoder embeddings to perform automatic speech recognition (ASR). In various embodiments, the Predictor Neural Network 620 may be implemented as a Long Short Term Memory (LSTM). The Predictor Neural Network 620 can also be configured to generate output values that are embeddings.

In various embodiments, the memory components 670 can include a Joiner Neural Network 630 that can be configured to combine two separate sets of input data from the Encoder and Predictor, where the data can be features/vectors, $h_t$ and $h_u$. The Joiner Neural Network 630 can be configured to produce an output, where the output can be letters, subwords, or words.

In various embodiments, the memory components 670 can include an Output Generator 640 configured to produce an output symbol sequence, y, 120 having a length, u−1. The Output Generator 640 can be configured to receive output from the Joiner Neural Network 630.

In various embodiments, the memory components 670 can include a Softmax Function 650 configured to generate predictions from the output values of the Joiner Neural Network 630.

In various embodiments, the memory components 670 can include a Synthesizer 660 configured to synthesize first domain audio data from first domain text data, and/or second domain audio data from second domain text data.

Figure 7:
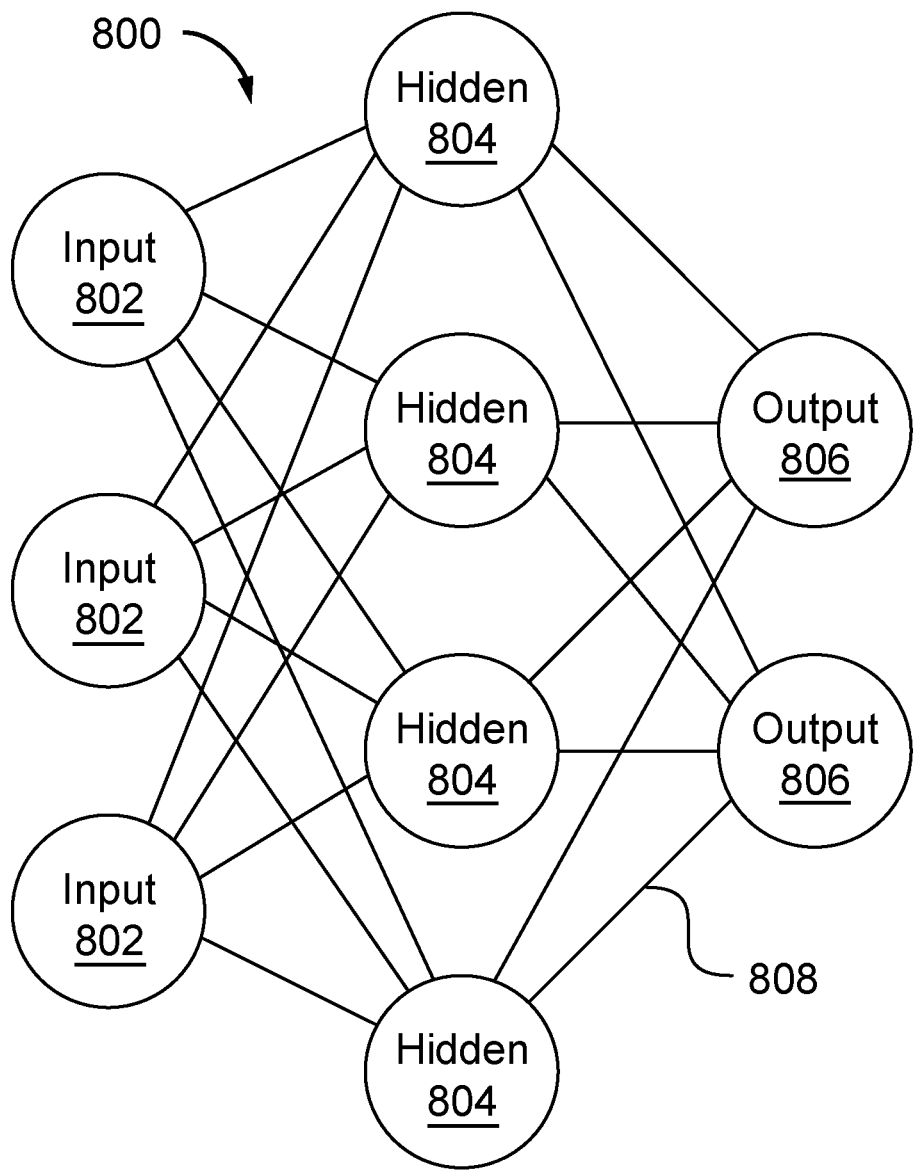
FIG. 7 is a block diagram illustratively depicting an exemplary neural network in accordance with another embodiment of the present invention.

FIG. 7 is a block diagram illustratively depicting an exemplary neural network in accordance with another embodiment of the present invention.

A neural network 800 may include a plurality of neurons/nodes, and the output nodes may communicate using one or more of a plurality of connections 808. The neural network 800, may include a plurality of layers, including, for example, one or more input layers 802, one or more hidden layers 804, and one or more output layers 806. In one embodiment, nodes at each layer may be employed to apply any function (e.g., input program, input data, etc.) to any previous layer to produce output, and the hidden layer 804, may be employed to transform inputs from the input layer (or any other layer) into output for nodes at different levels.

Figure 8:
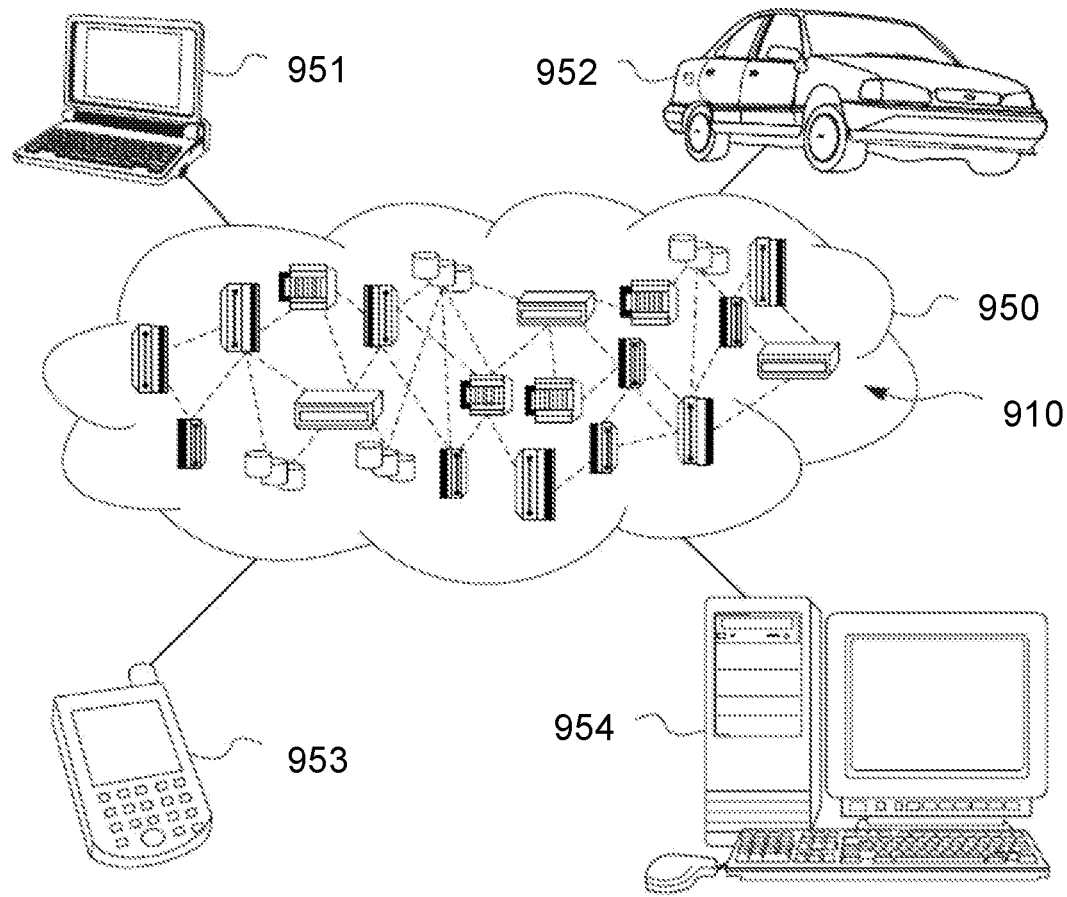
FIG. 8 is a block diagram showing an illustrative cloud computing environment having one or more cloud computing nodes with which local computing devices used by cloud consumers communicate in accordance with an embodiment.

FIG. 8 is a block diagram showing an illustrative cloud computing environment having one or more cloud computing nodes with which local computing devices used by cloud consumers communicate in accordance with an embodiment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring to FIG. 8, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 951, desktop computer 952, laptop computer 953, and/or automobile computer system 954 may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 951, 952, 953, 954 shown in FIG. 8 are intended to be illustrative only and that computing nodes 110 and cloud computing environment 950 can communicate with any type of computerized device over any type of network and/or network addressable connection (e.g., using a web browser).

Figure 9:
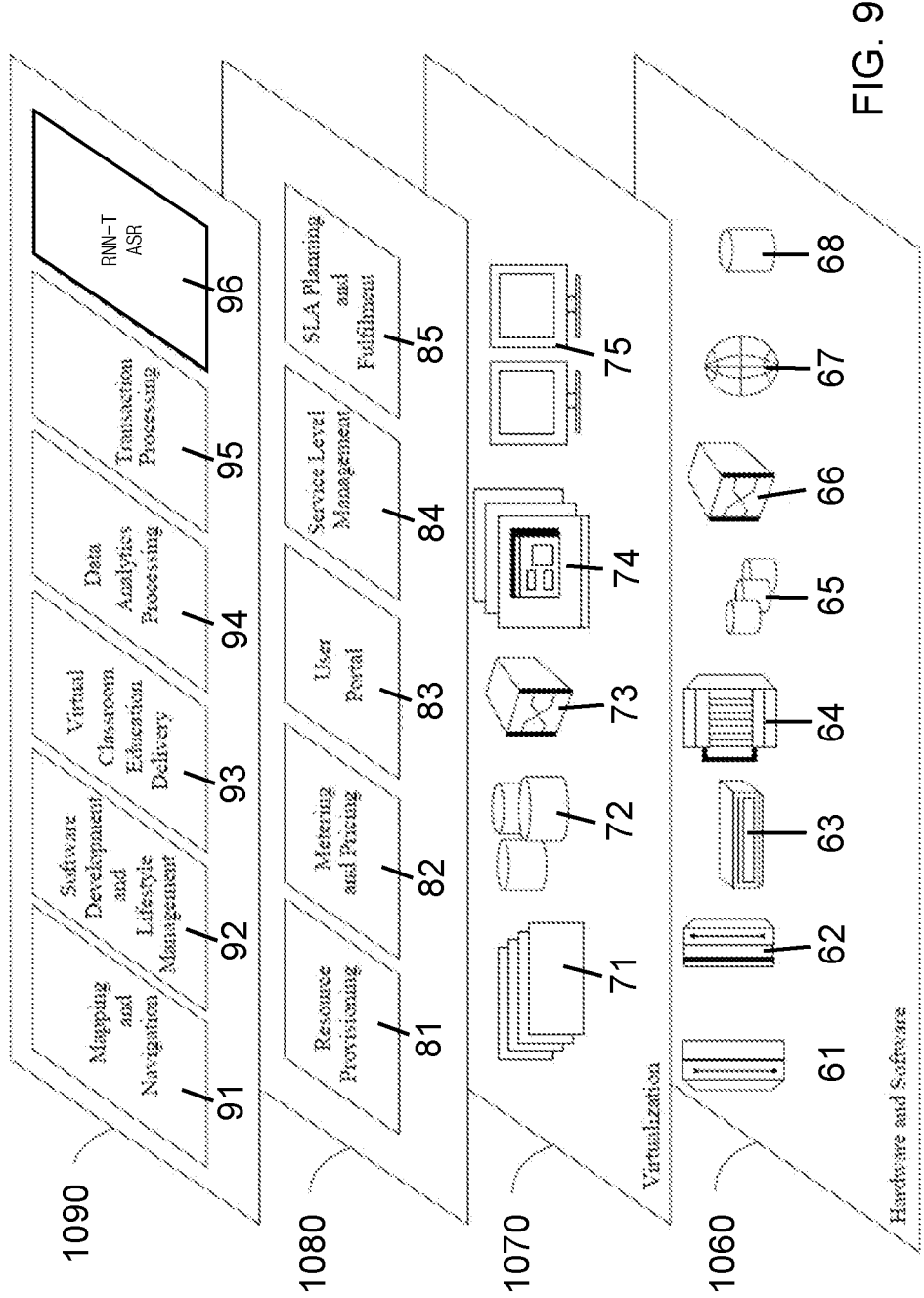
FIG. 9 is a block diagram showing a set of functional abstraction layers provided by a cloud computing environment in accordance with an embodiment.

FIG. 9 is a block diagram showing a set of functional abstraction layers provided by a cloud computing environment in accordance with an embodiment.

Referring to FIG. 9, a set of functional abstraction layers provided by a cloud computing environment 950 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1060 includes hardware and software components. Examples of hardware components include: mainframes 61; RISC (Reduced Instruction Set Computer) architecture based servers 62; servers 63, blade servers 64; storage devices 65; and networks and networking components 66. In some embodiments, software components include network application server software 67 and database software 68.

Virtualization layer 1070 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 1080 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a recurrent neural network transducer (RNN-T) implementing automatic speech recognition (ASR) 96, where the teacher neural network can be a recurrent neural network configured to learn automatic speech recognition and prepare a student neural network.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for customizing a recurrent neural network transducer (RNN-T), comprising:
   synthesizing first domain audio data from first domain text data from a first domain;
   feeding the synthesized first domain audio data into a trained encoder of the recurrent neural network transducer (RNN-T) having an initial condition, and updating the encoder by inputting both the synthesized first domain audio data and the first domain text data;
   synthesizing second domain audio data from second domain text data from a second domain;
   feeding the synthesized second domain audio data into the updated encoder of the recurrent neural network transducer (RNN-T), and updating a corresponding prediction network by inputting both the synthesized second domain audio data and the second domain text data;
   encoding a sequence of labels from the first and second domain text data into a text embedding using the prediction network, and combining outputs of the encoder and the prediction network with the synthesized first and second domain audio data using a joiner; and
   resetting the updated encoder to a pre-customized state by restoring weights on the updated encoder to the initial condition including a state trained on the first domain.

2. The method of claim 1, wherein the combining using the joiner produces an output as an induced local field, $z_{t,u}$, that is fed into a softmax function.

3. The method of claim 2, wherein the softmax function generates a posterior probability, $P(y|t,u)$.

4. The method of claim 3, therein the posterior, probability generator $P(y|t,u)$ generates an output that is an output sequence $y=(y_1, y_2, \ldots y_{U-1}, y_U)$ that is a length U output sequence based on an input feature sequence, x, that is a time-ordered sequence of acoustic features represented as vectors.

5. The method of claim 4, wherein the input feature sequence, x, is derived from the synthesized first domain audio data.

6. A system for customizing a recurrent neural network transducer (RNN-T), comprising:
   one or more processor devices;
   a memory in communication with at least one of the one or more processor devices; and
   a display screen;
   wherein the memory includes:
   an encoder configured to receive synthesized first domain audio data generated from first domain text data from a first domain, the encoder being a trained encoder of the recurrent neural network transducer (RNN-T) having an initial condition, is configured to be undated from the initial condition by inputting both the synthesized first domain audio data and the first domain text data, receive synthesized second domain audio data generated from second domain text data from a second domain and updating a corresponding prediction network by inputting both the synthesized second domain audio data and the second domain text data, encode a sequence of labels from the first and second domain text data into a text embedding using the prediction network, combine outputs of the encoder and the prediction network with the synthesized first and second domain audio data using a joiner, and a pre-customized state by restoring weights on the encoder to the initial condition including a state trained on the first domain; and
   an output sequence generator that produces output symbol sequence, y, based on an input feature sequence, x, that is a time-ordered sequence of acoustic features represented as vectors.

7. The system of claim 6, wherein the joiner produces an induced local field, $z_{t,u}$ as the output.

8. The system of claim 7, wherein the memory further includes a softmax function that is configured to receive induced local field and generate an output.

9. The system of claim 8, wherein the output sequence $y=(y_1, y_2, \ldots y_{U-1}, y_U)$ is a length U output sequence based on an input feature sequence, x, that is a time-ordered sequence of acoustic features represented as vectors.

10. The system of claim 9, wherein the memory further includes a synthesizer that is configured to synthesize first domain audio data from first domain text data, and to synthesize second domain audio data from second domain text data.

11. A computer program product for customizing a recurrent neural network transducer (RNN-T), the computer program product comprising one or more computer readable storage media, and program in: collectively stored on the one or more computer readable storage media; the program instructions executable by a computer, to cause the computer to:
   synthesize first domain audio data from first domain text data from a first domain;
   feed the synthesized first domain audio data into a trained encoder of the recurrent neural network transducer (RN) having an initial condition, and updating the encoder by inputting both the synthesized first domain audio data and the first domain text data;
   synthesize second domain audio data from second domain text data from a second domain;
   feed the synthesized second domain audio data into the updated encoder of the recurrent neural network transducer (RNN-T), and updating a corresponding predictor by inputting both the synthesized second domain audio data and the second domain text data;
   encode a sequence of labels from the first and second domain text data into a text embedding a using the predictor, and combine outputs of the encoder and the predictor with the synthesized first and second domain audio data using a joiner, and
   reset the updated encoder to a pre-customized state by restoring weights on the updated encoder to the initial condition including a state trained on the first domain.

12. The computer program product of claim 11, wherein the combining using, the joiner produces an output as an induced local field, $Z_{t,u}$ that is fed into a softmax function.

13. The computer program product of claim 12, wherein the softmax function generates a posterior probability, P(y|t, u).

14. The computer program product of claim 13, wherein the posterior probability generator P(y|u) generates an output that is an output sequence $y=(y_1, y_2, \ldots y_{U-1}, y_U)$ that is a length U output sequence based on an input feature sequence, x, that is a time-ordered sequence of acoustic features represented as vectors.

15. The computer program product of claim 14, wherein the first domain audio data is the input feature sequence, x.

16. A computer-implemented method for customizing a recurrent neural network transducer (RNN-T), comprising:
synthesizing first domain audio data from first domain text data from a first domain;
feeding the synthesized first domain audio data into a trained encoder of the recurrent neural network transducer (RNN-T) having an initial condition, and updating the encoder by inputting both the synthesized first domain audio data and the first domain text data by encoding the synthesized first domain audio data into acoustic embedding, $a_1$, wherein the acoustic embedding, $a_1$, compresses the synthesized first domain audio data into a smaller feature space;
feeding the acoustic, embedding, $a_1$, to a joiner;
synthesizing second domain audio data from second domain text data from a second domain;
feeding the synthesized second domain audio data into the updated encoder, wherein the updated encoder encodes the synthesized second domain audio data into acoustic embedding, $b_1$, wherein the acoustic embedding, $b_1$, compresses the synthesized second domain audio data into a smaller feature space;
feeding an output sequence from the joiner into a predictor of the recurrent neural network transducer (RNN-T), and updating the predictor by inputting both the synthesized second domain audio data and the second domain text data;
encoding a sequence of labels from the ins, and second domain text data into a text embedding using the predictor, and combining outputs of the encoder and the predictor with the synthesized first and second domain audio data using a joiner; and
resetting the updated encoder to a pre-customized state by restoring weights on the updated encoder to the initial condition including a state trained on the first domain.

17. The method of claim 16, wherein the joiner combines the acoustic embedding, at, with an embedding from the predictor through a weighted summation.

18. The method of claim 17, wherein the joiner produces an output as an induced local field, that is fed into a softmax function.

19. The method of claim 18, wherein the softmax function generates a posterior probability, P(y|t,u).

* * * * *